(12) United States Patent
Higgins et al.

(10) Patent No.: US 8,348,330 B2
(45) Date of Patent: Jan. 8, 2013

(54) WIRE HARNESS PROTECTOR AND TOUCH SENSOR ASSEMBLY

(75) Inventors: Christopher Michael Higgins, Ypsilanti, MI (US); Hideki Shimizu, Aichi (JP); Hironori Koeda, Gifu-Prefecture (JP); Yoshiteru Taniguichi, Aichi-Prefecture (JP)

(73) Assignees: Toyota Motor Engineering & Manufacturing North America, Inc., Erlanger, KY (US); Aisin Seiki Co., Ltd., Kariya-Shi, Aichi-Ken (JP)

( * ) Notice: Subject to any disclaimer, the term of this patent is extended or adjusted under 35 U.S.C. 154(b) by 502 days.

(21) Appl. No.: 12/628,708

(22) Filed: Dec. 1, 2009

(65) Prior Publication Data

US 2011/0126470 A1 Jun. 2, 2011

(51) Int. Cl.
 *B60J 10/08* (2006.01)
 *B60J 5/00* (2006.01)
 *E05F 15/00* (2006.01)
 *H01H 3/16* (2006.01)

(52) U.S. Cl. ... 296/146.1; 296/146.9; 49/27; 200/61.41; 200/61.43; 200/61.44

(58) Field of Classification Search .... 200/61.41–61.44, 200/61.71, 61.73, 85 R, 86 A, 85 A, 511, 200/512, 293; 49/26–28, 360, 502; 296/155, 296/146.1–146.9, 1.04, 193.06, 202, 207; 73/773

See application file for complete search history.

(56) References Cited

U.S. PATENT DOCUMENTS

| | | | |
|---|---|---|---|
| 3,056,628 A * | 10/1962 | Hans Golde | 296/219 |
| 5,092,647 A | 3/1992 | Ueda et al. | |
| 5,148,911 A * | 9/1992 | Miller et al. | 200/61.43 |
| 5,262,603 A * | 11/1993 | Miller | 200/61.43 |
| 5,592,060 A * | 1/1997 | Racine et al. | 318/469 |
| 5,962,814 A | 10/1999 | Skipworth et al. | |
| 6,000,959 A | 12/1999 | Curtindale et al. | |
| 6,087,593 A | 7/2000 | Skipworth et al. | |
| 6,092,859 A | 7/2000 | Serizawa et al. | |
| 6,225,583 B1 * | 5/2001 | Shigematsu et al. | 200/61.44 |
| 6,354,651 B1 | 3/2002 | Mori | |
| 6,546,674 B1 | 4/2003 | Emerling et al. | |
| 6,796,834 B2 | 9/2004 | Suzuki et al. | |
| 6,870,104 B2 | 3/2005 | Tsunoda et al. | |
| 6,919,511 B2 * | 7/2005 | Tsunoda et al. | 174/72 A |
| 7,055,885 B2 * | 6/2006 | Ishihara et al. | 296/146.4 |

(Continued)

FOREIGN PATENT DOCUMENTS

| | | |
|---|---|---|
| JP | 2006088859 A | 4/2006 |
| JP | 2007269250 A | 10/2007 |
| JP | 2008094141 A * | 4/2008 |

*Primary Examiner* — Michael Friedhofer

(74) *Attorney, Agent, or Firm* — Gifford, Krass, Sprinkle, Anderson & Citkowski, P.C.

(57) ABSTRACT

The present invention is a touch sensor assembly for a closing panel of a frame member that at least partially defines an opening and is oppositely disposed from the closing panel. The touch sensor assembly can have an elongated housing dimensioned to attach to a leading edge of the closing panel or a trailing edge of the frame member. The touch sensor assembly can also have a wire harness with a first portion encapsulated within the housing and a second portion that extends a predetermined length from the housing and passes through an aperture in the closing panel or an aperture in the frame member. A wire harness protector is also provided, the protector being attached to the wire harness proximate to the elongated housing.

10 Claims, 4 Drawing Sheets

U.S. PATENT DOCUMENTS

| | | |
|---|---|---|
| 7,381,898 B2 | 6/2008 | Ide |
| 7,958,672 B2 * | 6/2011 | Ishihara ............................ 49/26 |
| 2006/0096383 A1 | 5/2006 | Yamamoto et al. |
| 2006/0191203 A1 * | 8/2006 | Ueda et al. ........................ 49/27 |
| 2007/0107926 A1 | 5/2007 | Nishijima et al. |
| 2008/0210828 A1 | 9/2008 | Kogure et al. |

* cited by examiner

WIRE HARNESS PROTECTOR AND TOUCH SENSOR ASSEMBLY

FIELD OF THE INVENTION

The present invention is related to a touch sensor assembly, and in particular, a touch sensor assembly for a sliding door.

BACKGROUND OF THE INVENTION

The use of automated sliding doors as part of a motor vehicle, entry or exit to a building, and the like, is known. Such sliding doors typically close automatically when a predefined condition is met. For example, detection of lack of movement by a motion sensor at an entry or exit doorway can afford for one or more sliding doors to move in a closing direction. In addition, a sliding door of a motor vehicle can be mechanically closed by activation of a switch.

In most instances, a sensor affords for the sliding door to reverse its closing motion when an object is located near or within a closing path of the door. For example, a touch sensor assembly can be located at a leading edge of the sliding door such that if an object comes into contact with the touch sensor assembly, a signal is provided to a controller and the controller can direct the sliding door to stop and/or reverse its movement.

Sliding doors for motor vehicles typically have a touch sensor assembly in the form of a wire harness encapsulated within an elongated housing that is located and attached along a length of the leading edge of the door. The wire harness can have two or more electrically conducting wires running parallel with each other and when an object comes into contact with the wire harness, an electrical resistance between the wires can be altered and afford for a signal to be sent to a controller located within the motor vehicle.

In order for the change in resistance to be communicated from the point of contact to the controller, the wire harness and/or additional electrical wiring extends from the elongated housing to the controller. In some instances, the wire harness passes through an aperture within a panel of the sliding door and the aperture has a bounding edge that can abrade, cut, etc., the wire harness. As such, a wire harness protector can be used to prevent the wire harness from being damaged by the aperture edge and to cover from view/eyesight a portion of the wire harness that extends between the elongated housing and the aperture of the panel.

Heretofore touch sensor assemblies have used an elastomer wire harness protector molded directly onto an elongated housing in order to cover the wire harness from view and/or protect the wire harness from the edge of the aperture. However, such assemblies have resulted in an improper fit between the wire harness protector and the aperture due to tolerances of the elongated housing, the leading edge of the sliding door, the aperture within the panel of the door, etc. The use of such an elastomer wire harness protector has also presented shipping problems since the touch sensor assembly with the wire harness protector must be shipped as a single unit and the assembly and/or protector can become bent, crimped, and the like, if not packed properly. Therefore, a touch sensor assembly having a wire harness protector that provides for increased tolerance between the assembly and the sliding door, and allows for easier shipping, would be desirable.

SUMMARY OF THE INVENTION

The present invention discloses a touch sensor assembly for an opening that has a closing panel. The touch sensor assembly can have an elongated housing that can attach to a leading edge of the closing panel, or in the alternative, can attach to a trailing edge of a frame member that is oppositely disposed from the leading edge to the closing panel and at least partially defines the opening. The elongated housing can have a wire harness with a first portion encapsulated therewithin and a second portion that extends a predetermined length from the housing and passes through an aperture in the closing panel if the elongated housing is attached to the closing panel or an aperture in the frame member if the elongated housing is attached to the frame member. A wire harness protector is also provided, the protector being attached to the wire harness proximate to the elongated housing.

The wire harness protector can have a first clip that is operable to attach the wire harness protector to the wire harness and a second clip operable to attach the wire harness protector to the closing panel or the frame member, depending of course on whether the elongated housing is attached to the closing panel or frame member, respectively. The wire harness protector can also have a wire harness guide that is operable to hold the wire harness a predetermined distance from an edge of the aperture in the closing panel or the aperture in the frame member when the wire harness protector is attached thereto.

The first clip can have a living hinge, the living hinge being operable to attach the wire harness protector to one of a plurality of locations along the second portion of the wire harness. In this manner, the wire harness protector can be adjusted or located relative to the elongated housing in order to provide greater tolerance with respect to attaching to the closing panel or frame member and yet cover from view the second portion of the wire harness extending from the housing and passing through the aperture. In addition, the living hinge allows for the wire harness protector to be attached to the wire harness at any point during the manufacturing of the touch sensor assembly, closing panel and/or frame member.

The wire harness protector can be a generally rigid bracket, and in some instances can be generally planar or flat in shape. In other instances, the wire harness protector can be a generally rigid L-shaped bracket that has a first leg and a second leg extending from the first leg. The generally rigid bracket can also have an outer side and an inner side, and the first clip, second clip and wire harness guide can extend from the inner side of the wire harness protector. In addition, the first clip can extend from the first leg while the second clip and the wire harness guide can extend from the second leg of a generally rigid L-shaped bracket.

In some instances, the second portion of the wire harness can pass through the first clip and the wire harness guide before passing through the aperture of the closing panel or frame member. In addition, a guide rail can be located between the first clip and the wire harness guide with the second portion of the wire harness passing through the guide rail also.

DETAILED DESCRIPTION OF THE INVENTION

Figure 1:
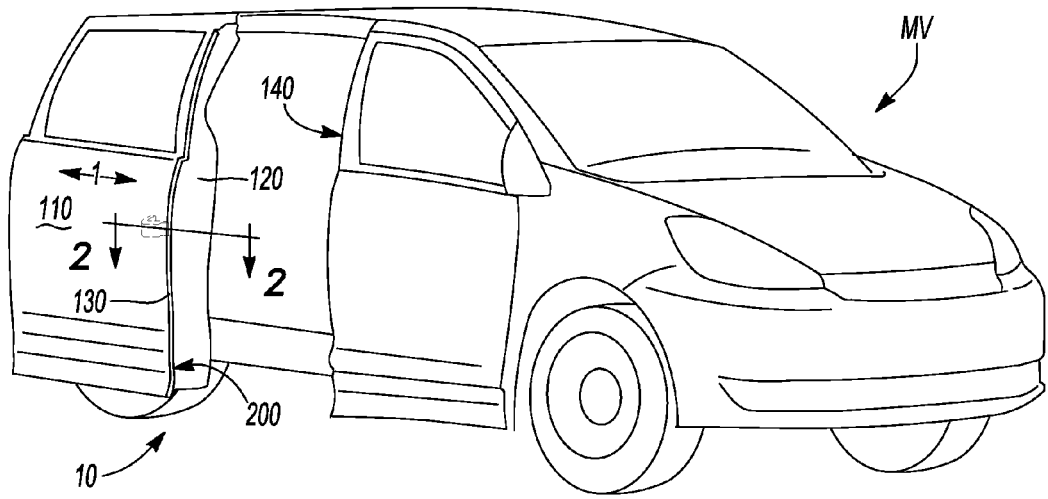
FIG. 1 is a perspective view of a closing panel in the form of a sliding door on a motor vehicle.

The present invention discloses a touch sensor assembly for use with a closing panel. As such, the touch sensor assembly has utility as a component for a motor vehicle.

The touch sensor assembly can include an elongated housing dimensioned to attach to, and along a length of, a leading edge of a closing panel, or in the alternative, a trailing edge of a frame member that at least partially defines an opening and is oppositely disposed from the leading edge of the closing panel. The touch sensor assembly also has a wire harness with a first portion that is encapsulated within the housing and a second portion that extends a predetermined length therefrom. The second portion of the wire harness can pass through an aperture in the closing panel or an aperture in the frame member, and thus afford electrical communication between a touch sensor and a controller and/or between the touch sensor and additional electrical wiring that extends to the controller. The elongated housing can be attached to the leading edge of the closing panel or the trailing edge of the frame member using any method or means known to those skilled in the art, illustratively including threaded fasteners, clips, adhesives, tape, friction fit and the like.

It is appreciated that a touch sensor can be made from the first portion of the wire harness encapsulated within the elongated housing, the first portion having one or more electrical wires that provide a signal when contacted by an object. For example and for illustrative purposes only, the wire harness can have two or more electrically conducting wires running generally parallel with each other along the leading edge of the closing panel, and when an object applies pressure to the wire harness, a distance between the generally parallel wires is altered. When the distance between the wires is altered, a corresponding change in electrical resistance is detected and a signal is transmitted to the controller.

A wire harness protector can also be included and be attached to the wire harness proximate to the elongated housing. The protector can have a first clip that is operable to attach the wire harness protector to the wire harness, a second clip operable to attach the wire harness protector to the closing panel or the frame member, and a wire harness guide that is operable to hold the wire harness a predetermined distance from an edge of the aperture in the closing panel or an edge of the aperture in the frame member when the protector is attached to the closing panel of frame member, respectively. The wire harness protector can also have an outer side and an inner side, the first clip, second clip, and wire harness guide extending from the inner side.

The first clip of the wire harness protector can have a living hinge that allows for the protector to be attached to one of a plurality of locations along the second portion of the wire harness. In this manner, the location of the wire harness protector relative to the elongated housing can be adjusted such that the outer side of the protector covers from view the entire second portion that extends from the housing to the aperture in the closing panel or frame member. In addition, the living hinge allows for the wire harness protector to be attached to the touch sensor assembly at any point during the manufacturing thereof. As such, the elongated housing with the wire harness at least partially encapsulated therewithin can be shipped separately from the wire harness protector and thereby save on shipping costs.

In some instances, the wire harness protector is generally rigid and generally planar or flat in shape. In other instances, the wire harness protector is a generally rigid L-shaped bracket that has a first leg with a second leg extending from the first leg. In still other instances, the wire harness protector can be a generally rigid bracket with any other shape that is complimentary to a portion of a closing panel, frame member and the like to which the bracket attaches to. In addition, if the wire harness protector is a generally rigid L-shaped bracket, the first clip can extend from the first leg and the second clip and wire harness guide can extend from the second leg.

The second portion of the wire harness can pass through the first clip and the wire harness guide before passing through the aperture of the closing panel or frame member. A guide rail can also be located between the first clip and the wire harness guide such that the second portion of the wire harness passes through the guide and is properly routed from the elongated housing and through one of the apertures without the presence of any kinks, sharp turns, and the like that could result in damage to the wire harness. In addition, the wire harness is held at a predetermined distance from the edge of the aperture such that the edge does not scrape, cut, etc., the harness.

Turning now to FIG. 1, a perspective view of a closing panel in the form of a sliding door 10 is shown relative to a minivan MV. It is appreciated that other types of closing panels are included within the scope of the invention, for example and for illustrative purposes only, a pivotable tailgate door/panel, a pivotable hatchback door and the like. The sliding door 10 can have an outer panel 110 and a front panel 120. In addition, the sliding door 10 can have a leading edge 130 that moves in a front-and-back direction 1 such that the door can be closed when the leading edge 130 approaches and is proximate to a frame member in the form of a pillar 140. It is appreciated that the sliding door is a sliding door for a motor vehicle, however any closing panel using automated opening and closing can use the touch sensor assembly disclosed herein.

Figure 2:
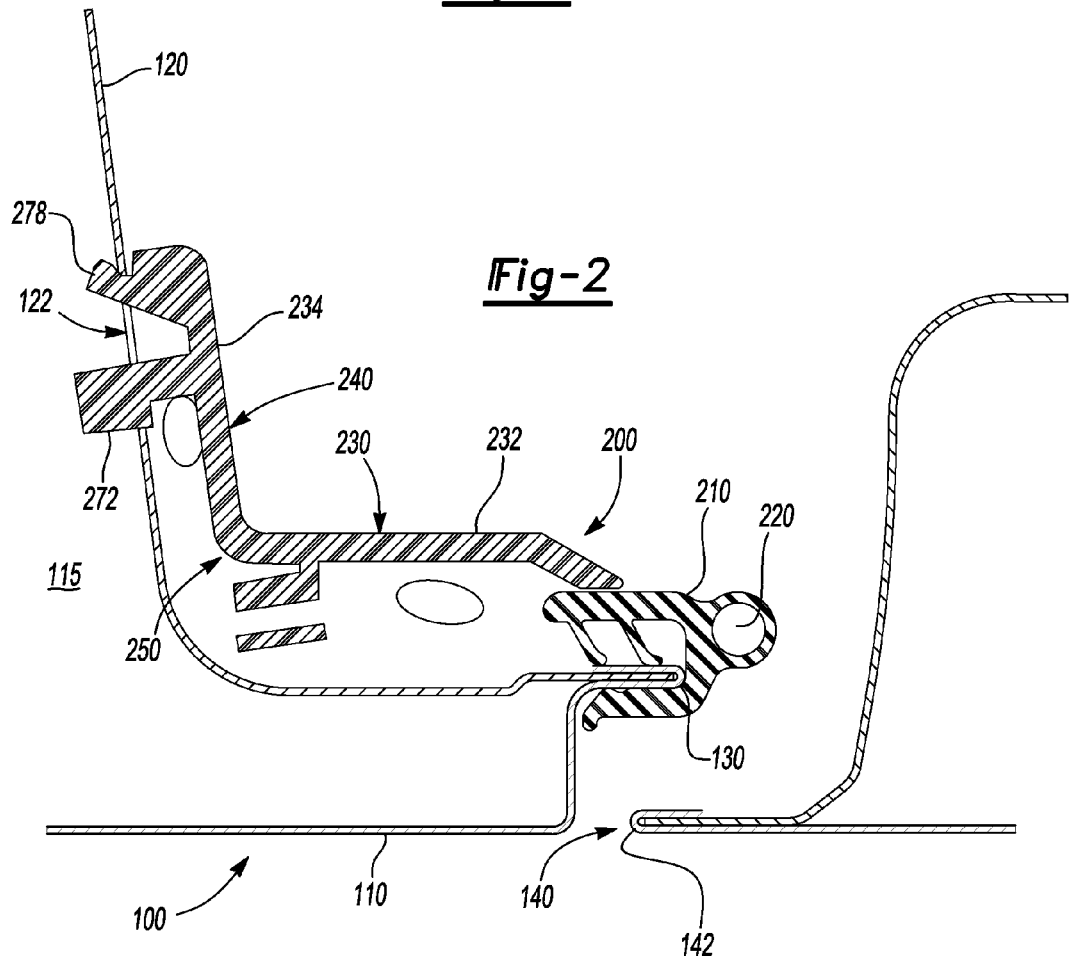
FIG. 2 is a top cross-sectional view of section 2-2 shown in FIG. 1.

FIG. 2 is a top cross-sectional view of the section 2-2 shown in FIG. 1 and illustrates a cross section of a touch sensor assembly 200. The touch sensor assembly 200 can have an elongated housing 210 (best shown in FIG. 3) that can extend along the length of the leading edge 130 of the door 10. At least partially encapsulated within the elongated housing 210 can be a wire harness 220, the wire harness 220 operable to provide a signal to a controller if and when an object comes into contact with or applies pressure to the harness 220. For example and for illustrative purposes only, when the sliding door 10 is moving forward in a closing direction and an object is in the space between the leading edge 130 and the pillar 140, the object can contact the elongated housing 210 with the wire harness 220 therewithin and contact results in a signal being transmitted to a controller. The controller then directs the sliding door 10 to stop its movement and/or reverse in a rearward direction. It is appreciated that the touch sensor assembly 200 can be attached to a trailing edge 142 of the pillar 140.

In order to facilitate the extension of the wire harness 220 from the elongated housing 210 through an aperture 122 of the front panel 120, a wire harness protector 230 can be provided. It is appreciated that the portion of the wire harness 220 passing through the front panel 120 can afford for electrical communication between the controller (not shown) and the portion of the wire harness 220 encapsulated within the elongated housing 210. It is further appreciated that the wire harness protector 230 can be used to facilitate the extension of the wire harness 220 from the elongated housing 210 through an aperture (not shown) in the pillar 140 if the touch sensor assembly is attached to the trailing edge 142 of the pillar 140.

Figure 3:
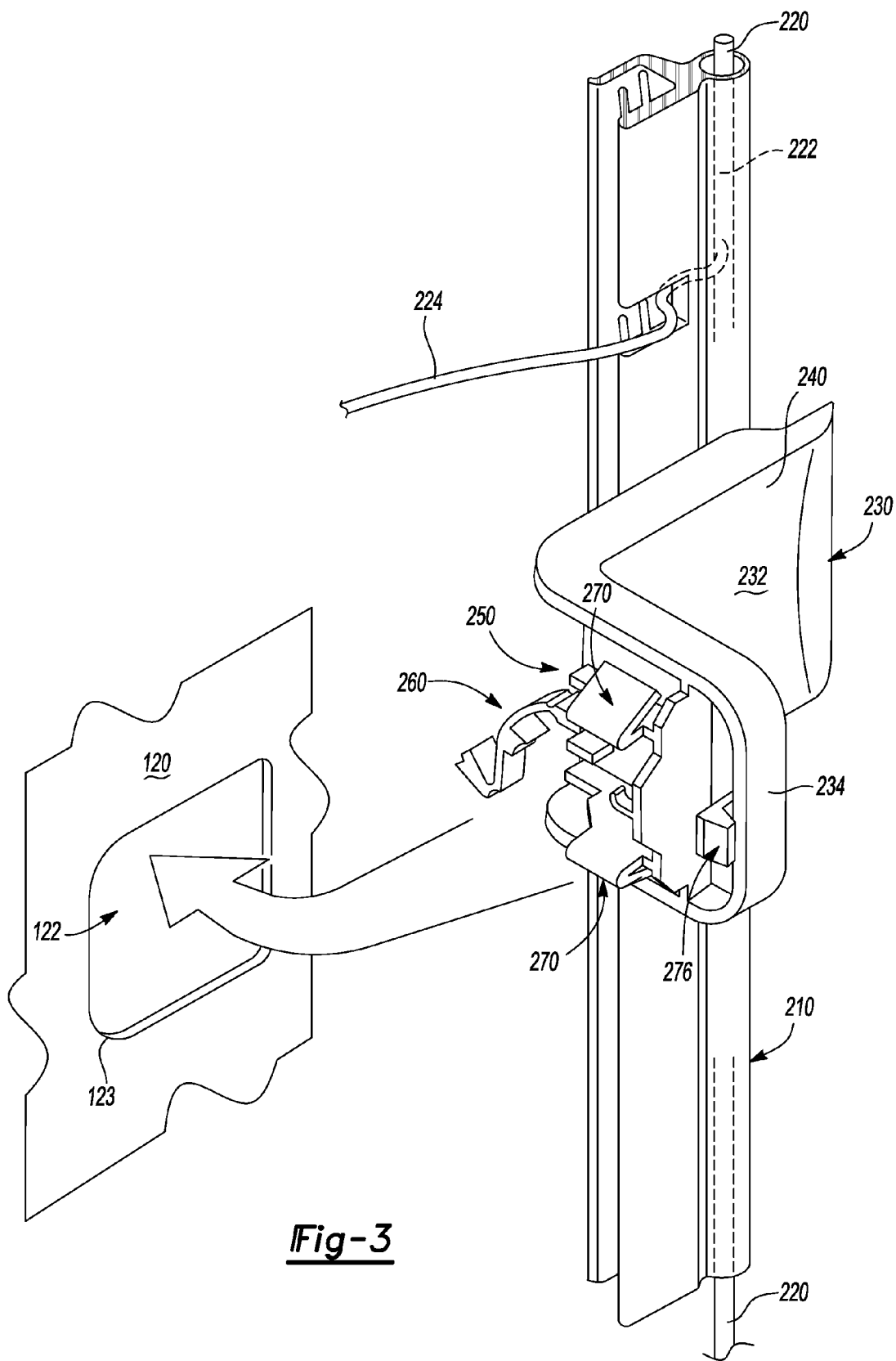
FIG. 3 is an exploded view of an embodiment of the present invention.

Turning now to FIG. 3, an exploded view of the elongated housing 210 and the wire harness protector 230 is shown. The wire harness protector 230 can have an outer side 240 and an inner side 250. In addition, an arrow in the figure illustrates that the protector 230 can fit within and/or attach to the aperture 122 within the panel 120. Also shown in FIG. 3, a first portion 222 of the wire harness 220 is at least partially encapsulated within the elongated housing 210 and a second portion 224 extends from the housing 210. In some instances, the second portion 224 extends from the housing 210 and into an inner space 115 (see FIG. 2) of the sliding door 10. As such, the wire harness protector 230 can provide a suitable cover over the second portion 224 between the elongated housing 210 and the aperture 122 such that the second portion 224 is hidden from view or eyesight by an individual using the sliding door, inspecting the sliding door, etc.

Figure 4:
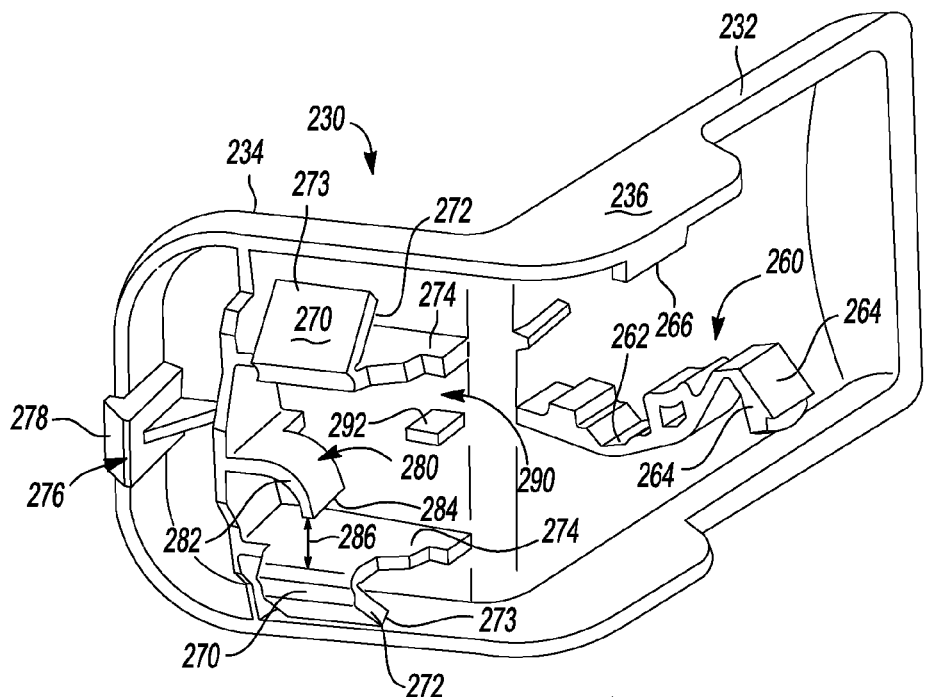
FIG. 4 is a perspective view of an inner side of a wire harness protector according to an embodiment of the present invention.
Figure 5:
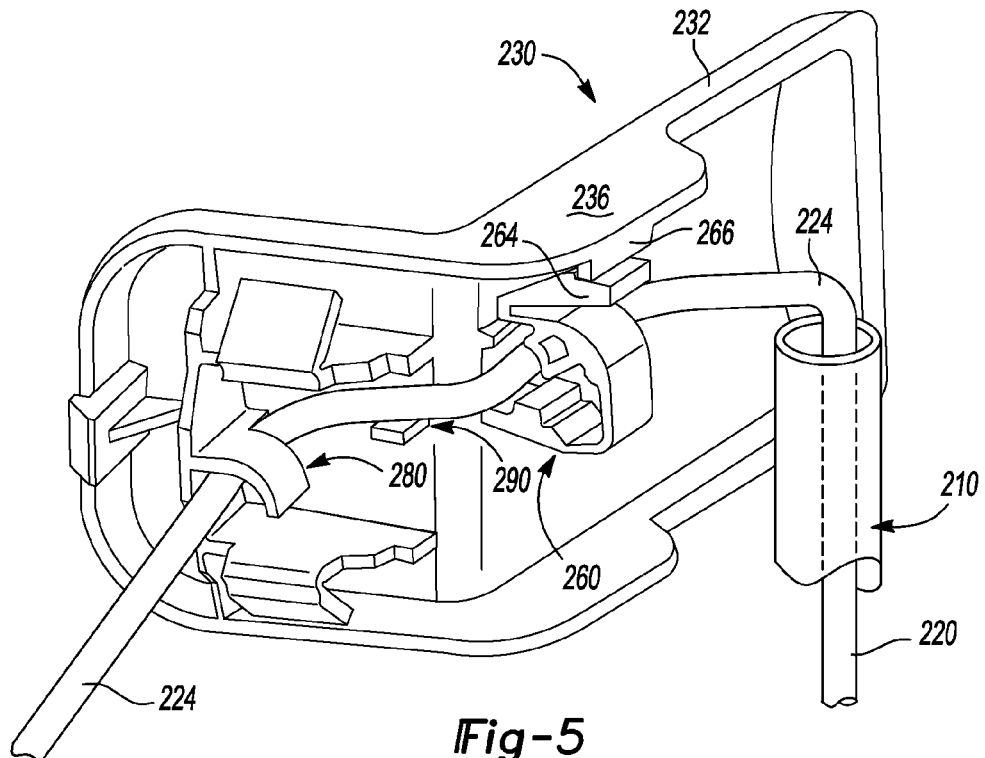
FIG. 5 is a perspective view of the wire harness protector shown in FIG. 4 with the addition of a wire harness.

Looking now at FIGS. 4 and 5, the wire harness protector 230 can be a generally rigid L-shaped bracket having a first leg 232 and a second leg 234. It is appreciated that the second leg 234 extends from the first leg 232. The inner side 250 of the wire harness protector 230 can have a first clip 260, a second clip 270, a wire harness guide 280, and/or a guide rail 290 extending therefrom. The first clip 260 can include a living hinge 262 and a tab 264 that can engage a lip 266 that extends from a side wall 236 of the first leg 232. In this manner, the wire harness protector 230 can be attached to the second portion 224 of the wire harness 220.

The second clip 270 can include two spaced apart clips as shown in FIG. 4, each clip having a tab 272 extending from a side wall 274 at an angle. The tab 272 can engage the edge 123 of the aperture 122 with a leading edge 273 contacting a back side of the panel 120 after the tab 272 has been pushed through the aperture 122. In this manner, the wire harness protector 230 can be attached to the sliding door 10.

The wire harness guide 280 can include an arcuate section 282 with a leading edge 284 that is spaced apart from the side wall 274 of a proximate second clip 270 by a predetermined distance 286. The distance or space 286 affords for the second portion 224 of the wire harness 220 to slide between the leading edge 284 and the side wall 274 of the proximate second clip 270 and be held in a generally fixed position relative to the spaced apart second clips 270. In addition, the second portion 224 can be held a predetermined distance from the edge 123 of the aperture 122 once the second clip 270 attaches the wire harness protector 230 to the front panel 120.

A guide rail 290 can also be included, the guide rail 290 having a tab 292 extending from the inner side 250 of the second leg 234. In combination with the side wall 274 of the second clip 270, the tab 292 can afford guidance or routing of the second portion 224 along the inner side 250 of the protector 230. In this manner, the second portion 224 is routed from the elongated housing 210 to the aperture 122 in such a manner that sharp turns, kinks, and the like are not present.

Figure 6:
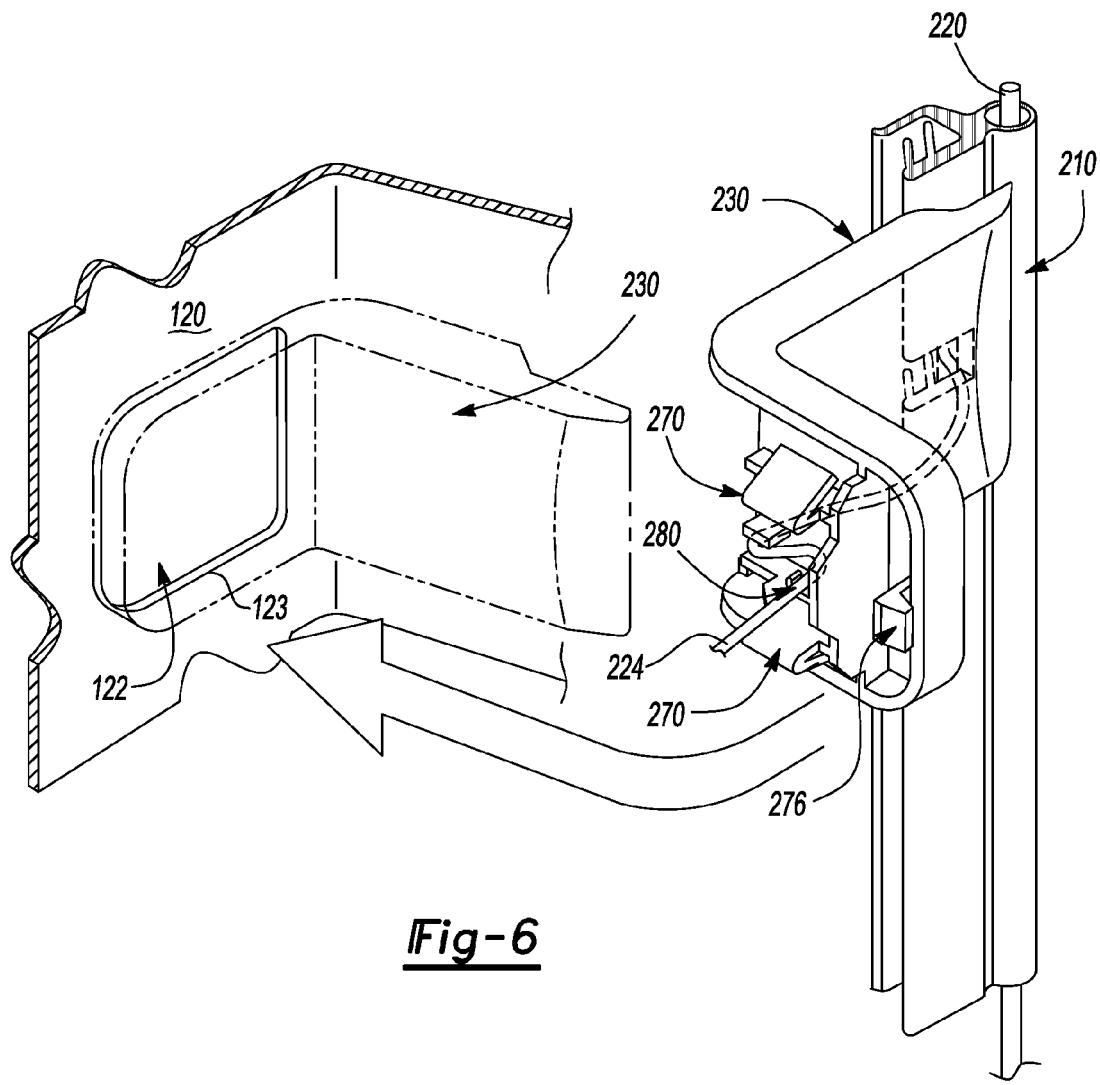
FIG. 6 is an exploded view of the embodiment shown in FIG. 3 with the presence of the wire harness.

Looking now at FIG. 6, an exploded view of the wire harness protector 230 having been attached to the second portion 224 of the wire harness 220 is shown. Once the wire harness protector 230 has been attached to the elongated housing 210 via the second portion 224, the second clip 270 can engage the edge 123 of the aperture 122 such that the outer side 240 hides or covers from view the length of the second portion 224 that extends between the elongated housing 210 to the aperture 122. In this manner, the portion of the wire harness 220 that is not encapsulated within the elongated housing 210, and is not within the sliding door 10, can be covered from view such that it is not visible by an individual that is using the sliding door, inspecting the door, inspecting the touch sensor assembly installed on the door, etc. In addition, since the wire harness protector 230 can be attached at one of a plurality of locations along the second portion 224, its placement or location relative to the elongated housing 210 and/or the aperture 122 affords for increased tolerance in the attachment of the elongated housing 210 to the leading edge 130 of the door 10. As such, the wire harness protector can be used with other devices that require a wire harness to pass from one location, through an aperture and to a separate location. For example and for illustrative purposes only, a wire harness protector as taught herein can be used to protect and provide greater tolerance for a wire harness extending from a defroster panel on a window glass and passing through an aperture in an adjacent frame member.

The elongated housing 210 can be made from any elastomer known to those skilled in the art, illustratively including bromo isobutylene isoprene, acrylonitrile butadiene, polybutadiene, chloro isobutylene isoprene, polychloroprene, chlorosulphonated polyethylene, epichlorohydrin, ethylene propylene, ethylene propylene diene monomers, fluoronated hydrocarbons, fluoro silicone, hydrogenated nitrile butadiene, polyisoprene, isobutylene isoprene butyl, methyl vinyl silicone, polyurethane, styrene butadiene, polysiloxane, acrylonitrile butadiene carboxy monomers and the like.

The wire harness protector 230 can be made from any material sufficiently rigid to hold a desired shape and/or hold the wire harness 220 in a desired position/location as it passes from the elongated housing 210 through the aperture 122. For example and for illustrative purposes only, the wire harness protector can be made from any thermoplastic polymer, monomer and/or block copolymer known to those skilled in the art, illustratively including acrylonitrile butadiene styrene, acrylic, celluloid, cellulose acetate, cycloolefin copolymer, ethylene-vinyl acetate, ethylene vinyl alcohol, fluoroplastics, liquid crystal polymers, polyacetal, polyacrylates, polyacrylonitrile, polyamide, polyamide-imide, polyaryletherketone, polybutadiene, polybutylene, polybutylene terephthalate, polycaprolactone, polychlorotrifluoroethylene, polyethylene terephthalate, polycyclohexylene dimethylene terephthalate, polycarbonate, polyhydroxyalkanoates, polyketone, polyester polyethylene, polyetheretherketone, polyetherketoneketone, polyetherimide, polyethersulfone, polysulfone, polyethylenechlorinates, polyimide, polylactic acid, polymethylpentene, polyphenylene oxide, polyphenylene sulfide, polyphthalamide, polypropylene, polystyrene, polysulfone, polytrimethylene terephthalate, polyurethane, polyvinyl acetate, polyvinyl chloride, polyvinylidene chloride, styrene-acrylonitrile, ethylene propylene diene monomers and polymers, including block copolymers, and the like.

It is appreciated that manufacture of the wire harness protector 230 from a thermoelastic polymer rather than an integrated elastomer can result in a cost saving. In addition, with the wire harness protector 230 being a separate component that is attachable at any time during the fabrication or manufacture of the touch sensor assembly 200, packing and shipping of the assembly can be performed with greater ease, space efficiency and reduced cost.

The invention is not restricted to the illustrative examples described above. The examples and embodiments are not intended as limitations on the scope of the invention. Methods, apparatus, compositions, and the like described herein are exemplary and not intended as limitations on the scope of the invention. Changes therein and other uses will occur to those skilled in the art. Therefore, the scope of the invention is defined by the scope of the claims.

We claim:

1. A touch sensor assembly for a closing panel, said touch sensor assembly comprising:
   an elongated housing dimensioned to attach to a leading edge of a closing panel or a trailing edge of a frame member;
   a wire harness having a first portion encapsulated within said housing and a second portion extending a predetermined length from said housing and passing through an aperture in the closing panel or the frame member;
   a separate wire harness protector attached to said wire harness proximate said housing;
   said wire harness protector having a first clip attaching said wire harness protector to said wire harness, a second clip operable to attach said wire harness protector to the closing panel or frame member, and a wire harness guide operable to hold said wire harness a predetermined distance from an edge of the aperture of the closing panel or the frame member when said wire harness protector is attached to the closing panel or the frame member, respectively.

2. The touch sensor assembly of claim 1, wherein said wire harness protector has an outer side and an inner side, said first clip, said second clip and said wire harness guide extending from said inner side.

3. The touch sensor assembly of claim 2, wherein said second portion of said wire harness extends from said elongated housing and passes through said first clip and said wire harness guide before passing through the aperture of the closing panel or frame member.

4. The touch sensor assembly of claim 3, further comprising a guide rail located between said first clip and said wire harness guide, said second portion of said wire harness passing through said guide rail.

5. The touch sensor assembly of claim 2, wherein said outer side covers from view said second portion of said wire harness extending between said housing and the aperture in the sliding door.

6. The touch sensor assembly of claim 2, wherein said wire harness protector is a generally rigid L-shaped bracket having a first leg and a second leg extending from said first leg.

7. The touch sensor assembly of claim 6, wherein said first clip extends from said first leg, and said second clip and said wire harness guide extend from said second leg.

8. The touch sensor assembly of claim 1, wherein said first clip of said wire harness protector has a living hinge, said living hinge operable for said first clip to attach said wire harness protector to one of a plurality of locations along said second portion of said wire harness.

9. The touch sensor assembly of claim 1, wherein said elongated housing is made from an elastomer and said wire harness protector is made from a thermoplastic polymer.

10. The touch sensor assembly of claim 1, wherein said elongated housing and said wire harness protector are attached to a motor vehicle sliding door.

* * * * *